(12) United States Patent
Huang

(10) Patent No.: US 8,473,767 B2
(45) Date of Patent: Jun. 25, 2013

(54) ELECTRONIC DEVICE AND POWER MANAGEMENT METHOD THEREOF

(75) Inventor: Chao-Jui Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 243 days.

(21) Appl. No.: 13/162,582

(22) Filed: Jun. 17, 2011

(65) Prior Publication Data

US 2012/0151237 A1   Jun. 14, 2012

(30) Foreign Application Priority Data

Dec. 13, 2010   (TW) .................................. 99143431

(51) Int. Cl.
*G06F 1/32*     (2006.01)
*G06F 3/00*     (2006.01)

(52) U.S. Cl.
USPC ........... 713/324; 713/300; 713/320; 713/323; 710/15; 710/18; 710/19

(58) Field of Classification Search
USPC .................... 713/300, 320, 323, 324; 710/15, 710/18, 19
See application file for complete search history.

(56) References Cited

U.S. PATENT DOCUMENTS

| | | | |
|---|---|---|---|
| 5,872,669 A * | 2/1999 | Morehouse et al. | 360/69 |
| 7,010,711 B2 * | 3/2006 | Bashford et al. | 713/323 |
| 7,302,501 B1 * | 11/2007 | Cain et al. | 710/15 |
| 2006/0161793 A1 * | 7/2006 | Orr | 713/300 |
| 2006/0271800 A1 * | 11/2006 | Li et al. | 713/300 |
| 2011/0185208 A1 * | 7/2011 | Iwamoto et al. | 713/323 |
| 2011/0252356 A1 * | 10/2011 | Morris | 715/772 |

* cited by examiner

*Primary Examiner* — Vincent Tran

(74) *Attorney, Agent, or Firm* — Altis Law Group, Inc.

(57) ABSTRACT

A method for managing power of an electronic device receives a power signal of a peripheral device of the electronic device, determines if a data signal of the peripheral device is received at a preset time interval, and sends a time record command to a timer of the electronic device if the data signal is not received to obtain a recorded time of the electronic device. The method further displays an idle status of the peripheral device if the recorded time is greater than a first preset value, and stops supplying power to the peripheral device if the recorded time is greater than a second preset value.

20 Claims, 3 Drawing Sheets

# ELECTRONIC DEVICE AND POWER MANAGEMENT METHOD THEREOF

BACKGROUND

1. Technical Field

Embodiments of the present disclosure relate to an electronic device and method for managing the power of the electronic device.

2. Description of Related Art

Power supplies in a computer are controlled by an operating system (OS) of the computer. If all peripheral devices of the computer have been idle for over a specified time (e.g., five minutes), the OS controls the computer to enter a standby mode or a sleep mode to reduce power consumption. However, one peripheral device "A" may be idle for a long time (e.g., ten minutes) even though other peripheral devices of the computer are still being used. The OS does not stop supplying power to the peripheral device "A" until all of the peripheral devices of the computer have not been used for the specified time. Thus, the power supplied to the peripheral device "A" is wasted. Therefore, a more efficient method for managing power of an electronic device is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
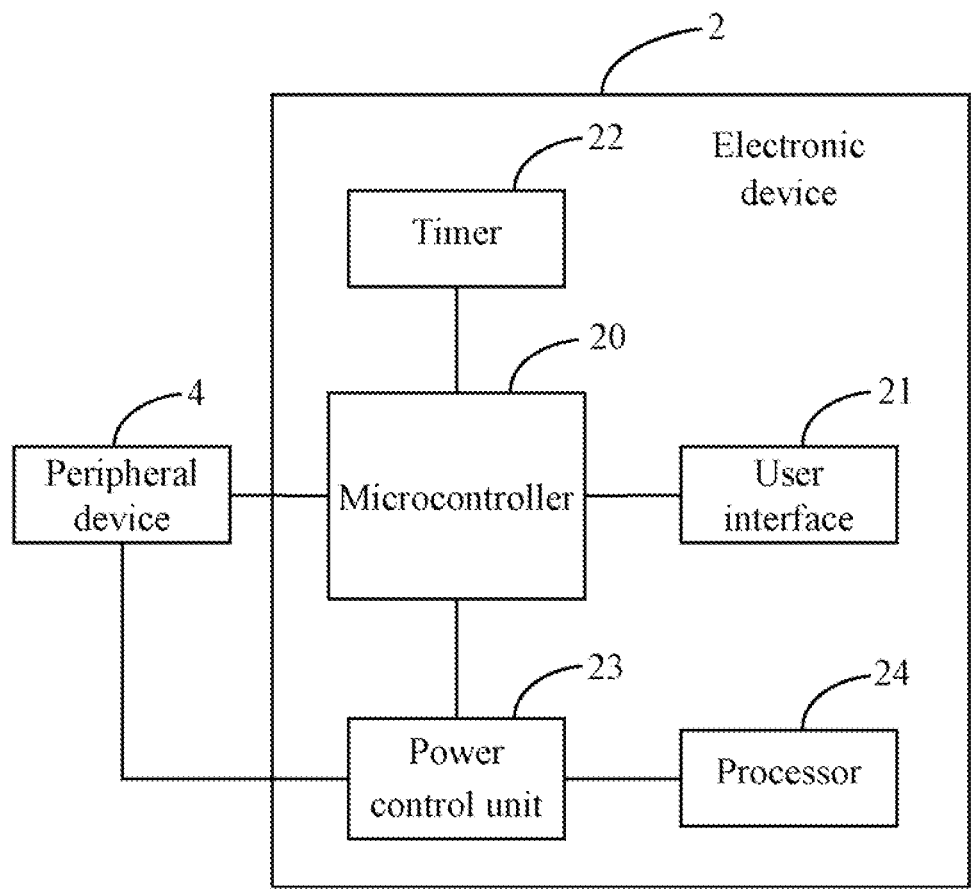
FIG. 1 is a block diagram of one embodiment of an electronic device.

FIG. 1 is a block diagram of one embodiment of an electronic device 2. In one embodiment, the electronic device may include, but is not limited to, a microcontroller 20, a user interface 21, a timer 22, and a power control unit 23. The electronic device 2 connects with one or more peripheral devices 4 (only one is shown in FIG. 1). The microcontroller 20 may be used to manage power supplied to the peripheral device 4, and stop supplying the power to the peripheral device 4 upon the condition that the peripheral device 4 has not been used for a specified time (e.g., ten minutes). A detailed description will be given in the following paragraphs.

In one embodiment, the user interface 21 may be provided by an operating system of the electronic device 2. The power control unit 23 is installed in a basic input output system (BIOS) of the electronic device 2, to control the power supply of the peripheral device 4. The peripheral device 4 may be a mouse, a keyboard, or a universal serial bus (USB) flash disk of the electronic device 2. The electronic device 2 may further include a storage device (not shown in FIG. 1) and at least one processor 24.

Figure 2:
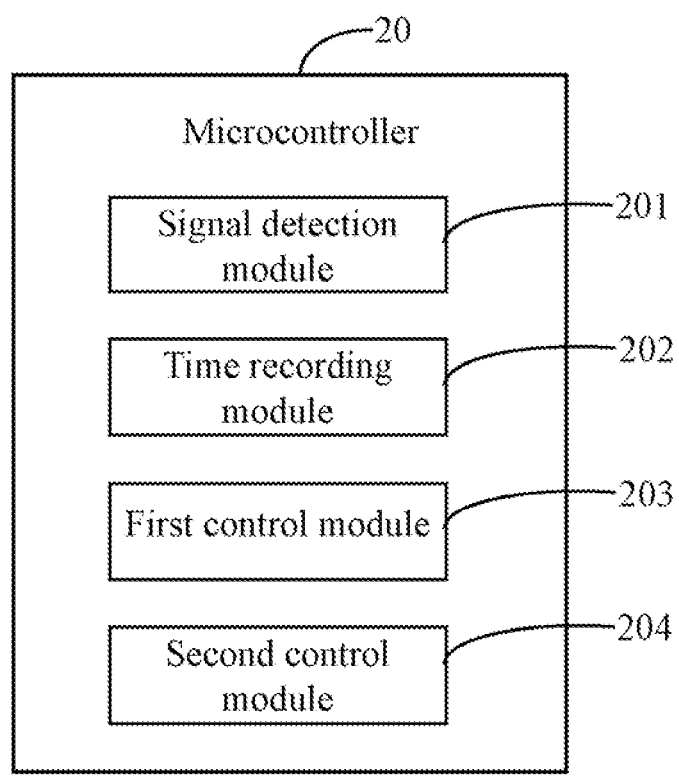
FIG. 2 is a block diagram of one embodiment of a microcontroller in the electronic device.

FIG. 2 is a block diagram of one embodiment of the microcontroller 20 in the electronic device 2. In one embodiment, the microcontroller 20 may include one or more modules, for example, a signal detection module 201, a time recording module 202, a first control module 203, and a second control module 204. The one or more modules 201-204 may comprise computerized code in the form of one or more programs that are stored in the storage device (or memory) of the electronic device 2. The computerized code includes instructions that are executed by the at least one processor 24 of the electronic device 2 to provide functions for the one or more modules 201-204.

Figure 3:
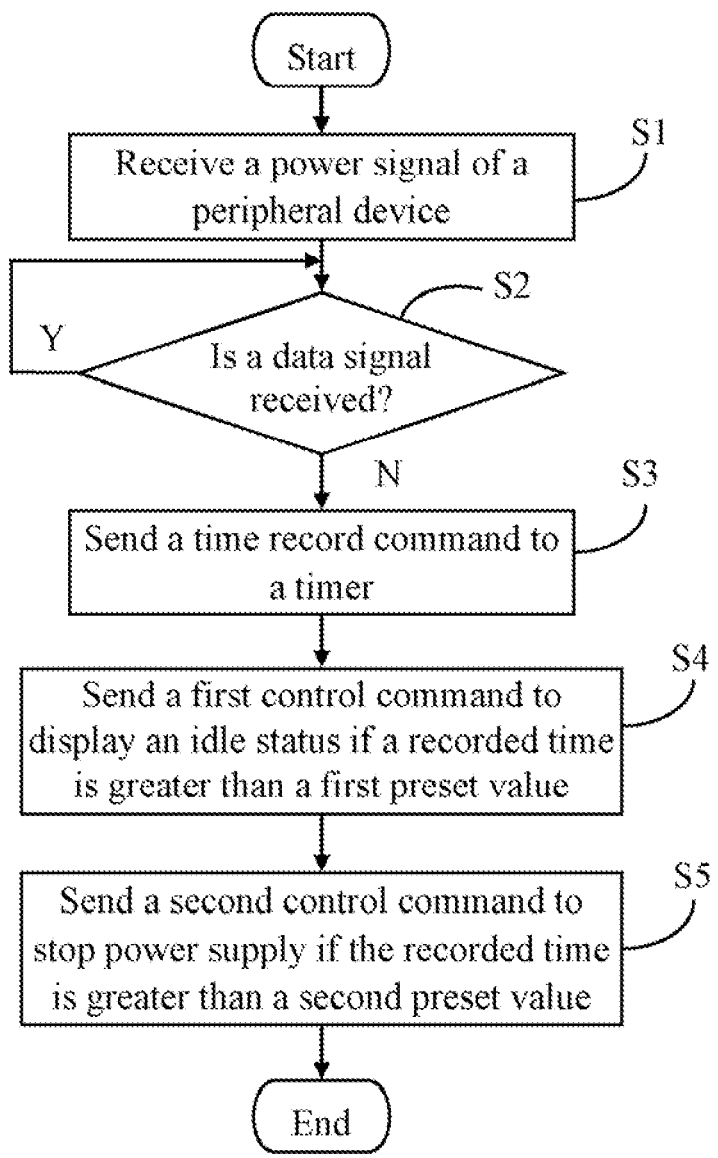
FIG. 3 is a flowchart of one embodiment of a method for managing power of the electronic device.

FIG. 3 is a flowchart of one embodiment of a method for managing power the electronic device 2. Depending on the embodiment, additional blocks may be added, others removed, and the ordering of the blocks may be changed.

In block S1, the signal detection module 201 receives a power signal of the peripheral device 4 of the electronic device 2.

In block S2, the signal detection module 201 determines if a data signal of the peripheral device 4 is received at a preset time interval (e.g., 1 second) when the power signal of the peripheral device 4 is received. If the data signal of the peripheral device 4 is not received, the procedure goes to block S3. If the data signal of the peripheral device 4 is received, the block S2 is repeated.

In block S3, the time recording module 202 sends a time record command to the timer 22 of the electronic device 2, and obtains a recorded time of the electronic device 2 using the timer 22.

In block S4, if the recorded time is greater than a first preset value (e.g., five minutes), the first control module 203 sends a first control command to the operating system of the electronic device 2, and displays an idle status of the peripheral device 4 on the user interface 21. For example, the first control module 203 displays a text box on the user interface 21 to show information of the idle status of the peripheral device 4.

In other embodiments, the first control module 203 further controls a first flickering color of an indicator light of the peripheral device 4 to display the idle status of the peripheral device 4 upon the condition that the recorded time is greater than the first preset value. For example, the first flickering color may be yellow.

In block S5, if the recorded time is greater than a second preset value (e.g., ten minutes), the second control module 204 sends a second control command to the power control unit 23 of the electronic device 2, and controls the power control unit 23 to stop supplying power to the peripheral device 4. In one embodiment, the second preset value is greater than the first preset value.

In another embodiment, the second control module 204 may send the second control command to the operating system of the electronic device 2 if the recorded time is greater than the second preset value, and display an offline status of the peripheral device 4 on the user interface 21. For example, the second control module 204 displays a text box on the user interface 21 to show information of the offline status of the peripheral device 4.

Furthermore, the second control module 204 controls a second flickering color of the indicator light of the peripheral device 4 to display the offline status of the peripheral device 4 if the recorded time is greater than the second preset value. For example, the second flickering color may be red.

In other embodiments, the peripheral device 4 may be unlocked manually or automatically by detecting user operations on the peripheral device 4 for use when the peripheral device 4 is under the offline status. The microcontroller 20 controls the power control unit 23 to resume the power supply to the peripheral device 4.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for managing power of an electronic device, the method comprising:
    receiving a power signal of a peripheral device of the electronic device;
    determining if a data signal of the peripheral device is received at a preset time interval;
    sending a time record command to a timer of the electronic device upon the condition that the data signal is not received, and obtaining a recorded time of the electronic device using the timer;
    sending a first control command to an operating system of the electronic device upon the condition that the recorded time is greater than a first preset value, and displaying an idle status of the peripheral device on a user interface of the electronic device; and
    sending a second control command to a power control unit of the electronic device upon the condition that the recorded time is greater than a second preset value, and stopping a power supply of the peripheral device from supplying power to the peripheral device.

2. The method according to claim 1, wherein the second preset value is greater than the first preset value.

3. The method according to claim 1, further comprising: controlling an indicator light of the peripheral device to display the idle status of the peripheral device upon the condition that the recorded time is greater than the first preset value.

4. The method according to claim 3, wherein the indicator light flickers in response to displaying the idle status of the peripheral device.

5. The method according to claim 1, further comprising: sending the second control command to the operating system of the electronic device upon the condition that the recorded time is greater than the second preset value, and displaying an offline status of the peripheral device on the user interface of the electronic device.

6. The method according to claim 1, further comprising: controlling an indicator light of the peripheral device to display an offline status of the peripheral device upon the condition that the recorded time is greater than the second preset value.

7. The method according to claim 6, wherein the indicator light flickers in response to displaying the offline status of the peripheral device.

8. An electronic device, comprising:
    a storage device;
    at least one processor; and
    one or more modules that are stored in the storage device and are executed by the at least one processor, the one or more modules comprising instructions:
    to receive a power signal of a peripheral device of the electronic device;
    to determine if a data signal of the peripheral device is received at a preset time interval;
    to send a time record command to a timer of the electronic device upon the condition that the data signal is not received, and obtain a recorded time of the electronic device using the timer;
    to send a first control command to an operating system of the electronic device upon the condition that the recorded time is greater than a first preset value, and display an idle status of the peripheral device on a user interface of the electronic device; and
    to send a second control command to a power control unit of the electronic device upon the condition that the recorded time is greater than a second preset value, and stop a power supply of the peripheral device from supplying power to the peripheral device.

9. The electronic device according to claim 8, wherein the second preset value is greater than the first preset value.

10. The electronic device according to claim 8, wherein the one or more modules further comprise instructions: controlling an indicator light of the peripheral device to display the idle status of the peripheral device upon the condition that the recorded time is greater than the first preset value.

11. The electronic device according to claim 10, wherein the indicator light flickers in response to displaying the idle status of the peripheral device.

12. The electronic device according to claim 8, wherein the one or more modules further comprise instructions: sending the second control command to the operating system of the electronic device upon the condition that the recorded time is greater than the second preset value, and displaying an offline status of the peripheral device on the user interface of the electronic device.

13. The electronic device according to claim 8, wherein the one or more modules further comprise instructions: controlling an indicator light of the peripheral device to display an offline status of the peripheral device upon the condition that the recorded time is greater than the second preset value.

14. The electronic device according to claim 13, wherein the indicator light flickers in response to displaying the offline status of the peripheral device.

15. A non-transitory storage medium having stored thereon instructions that, when executed by a processor of an electronic device, causes the processor to perform a method for managing power of the electronic device, the method comprising:
    receiving a power signal of a peripheral device of the electronic device;
    determining if a data signal of the peripheral device is received at a preset time interval;
    sending a time record command to a timer of the electronic device upon the condition that the data signal is not received, and obtaining a recorded time of the electronic device using the timer;
    sending a first control command to an operating system of the electronic device upon the condition that the recorded time is greater than a first preset value, and displaying an idle status of the peripheral device on a user interface of the electronic device; and
    sending a second control command to a power control unit of the electronic device upon the condition that the recorded time is greater than a second preset value, and stopping a power supply of the peripheral device from supplying power to the peripheral device.

16. The non-transitory storage medium according to claim 15, wherein the second preset value is greater than the first preset value.

17. The non-transitory storage medium according to claim 15, wherein the method further comprises: controlling an indicator light of the peripheral device to display the idle status of the peripheral device upon the condition that the recorded time is greater than the first preset value.

18. The non-transitory storage medium according to claim 15, wherein the method further comprises: sending the second control command to the operating system of the electronic device upon the condition that the recorded time is greater than the second preset value, and displaying an offline status of the peripheral device on the user interface of the electronic device.

19. The non-transitory storage medium according to claim 15, wherein the method further comprises: controlling an indicator light of the peripheral device to display an offline status of the peripheral device upon the condition that the recorded time is greater than the second preset value.

20. The non-transitory storage medium according to claim 15, wherein the medium is selected from the group consisting of a hard disk drive, a compact disc, a digital video disc, and a tape drive.

\* \* \* \* \*